US012403487B2

(12) United States Patent
Liu et al.

(10) Patent No.: US 12,403,487 B2
(45) Date of Patent: Sep. 2, 2025

(54) MULTIFUNCTIONAL HANDHELD SHOWER

(71) Applicant: Xiamen Rainshower Co. Ltd., Xiamen (CN)

(72) Inventors: Hewei Liu, Xiamen (CN); Weifeng Zeng, Xiamen (CN); Ruiqiang Zhang, Xiamen (CN)

(73) Assignee: Xiamen Rainshower Co. Ltd., Xiamen (CN)

( * ) Notice: Subject to any disclaimer, the term of this patent is extended or adjusted under 35 U.S.C. 154(b) by 365 days.

(21) Appl. No.: 18/130,399

(22) Filed: Apr. 3, 2023

(65) Prior Publication Data

US 2023/0311135 A1 Oct. 5, 2023

(30) Foreign Application Priority Data

Apr. 2, 2022 (CN) ......................... 202220773323.4

(51) Int. Cl.

*B05B 1/16* (2006.01)
*E03C 1/04* (2006.01)
*E03C 1/02* (2006.01)

(52) U.S. Cl.

CPC .......... *B05B 1/1618* (2013.01); *E03C 1/0408* (2013.01); *E03C 2001/026* (2013.01)

(58) Field of Classification Search

CPC ........... B05B 12/002; B05B 1/16; B05B 1/18; B05B 1/185; B05B 1/1609; B05B 1/1618; B05B 1/1627; B05B 1/1681; B05B 1/1636; B05B 15/62; E03C 2201/30; E03C 1/023; E03C 1/0404; E03C 1/104; E03C 1/0408; E03C 1/0405; E03C 2001/026; E03C 2001/0414; F16K 11/0445; F16K 11/0716

See application file for complete search history.

(56) References Cited

U.S. PATENT DOCUMENTS 2,939,474 A * 6/1960 De Simone ......... F16K 11/0445 137/119.04

FOREIGN PATENT DOCUMENTS

EP 3896318 A1 * 10/2021 ............. E03C 1/023

* cited by examiner

*Primary Examiner* — Christopher R Dandridge

(57) ABSTRACT

The invention discloses a multifunctional shower, which includes a body, a water outlet assembly, a water channel switching device and a water stop device. The inner cavity of the body is hollow and has a handle; The shower water inlet channel and the spray gun water inlet channel are separated, and there is a water passage hole connected to the outlet end of the shower water inlet channel; the water channel switching device and the water stop device are set in the body, and by adjusting the water channel switching device, The water flow selectively flows to the shower water inlet channel or the spray gun water inlet channel; by adjusting the water stop device, the shower can be switched between the water stop state and the water flow state.

13 Claims, 12 Drawing Sheets

MULTIFUNCTIONAL HANDHELD SHOWER

CROSS REFERENCE TO RELATED APPLICATIONS

This application is based upon and claims priority to Chinese Patent Application No. 202220773323.4, filed on Apr. 2, 2022, the entire contents of which are incorporated herein by reference.

FIELD OF THE INVENTION

The invention relates to the field of sanitary ware, in particular to a multifunctional shower.

BACKGROUND OF THE INVENTION

The industry discloses a shower with water stop function and water channel switching function, see CN107350097A for details, as shown in FIG. 1, including valve body 10', switching device 20', water stop device 30', switching device 20' and The water stop device 30' is accommodated in the valve body 10', the switching device 20' includes a switching mechanism 22' and a swing mechanism 24' connected together by transmission, and the swing mechanism 24' can push the switch mechanism 22' to switch the water channel; the water stop device 30' includes a valve shaft 32' and a valve sleeve 34' connected together, the valve shaft 32' drives the valve sleeve 34' to move the switch waterway in the open position and the closed position in the axial direction; it also includes the control device 40', the control device 40' includes a button 42' and a linkage mechanism 44', the middle part of the button 42' is hinged on the valve body 10', and the linkage mechanism 44' is connected between the valve shaft 32' and the button 42'; when the front part of the button 42' is pressed, the button 42' pushes the swing mechanism 24' to switch the waterway, and the button 42' drives the connecting rod mechanism 44' to make the valve sleeve 34' open the waterway or close the waterway.

However, the bathroom floor is easily covered with dirt, and the disclosed shower outlet panel has a small water pressure and dispersed water flow through the water outlet pores, making it impossible to rinse the bathroom floor and does not have a floor flushing function.

In view of this, the present inventor has conducted in-depth research on the above-mentioned defects in the prior art, and thus this case arises.

SUMMARY OF THE INVENTION

An object of the present disclosure is to provide a shower with the functions of water stop, water channel switching and spray gun.

In order to achieve the above object, the following solutions are provided by the present disclosure: A multifunctional shower, it comprising:

a body, which is composed of a water outlet part and a hand-held part, the water outlet part is provided with an open-ended containment cavity, and at least one spray hole is provided at an end away from the hand-held part, an inner cavity of the hand-held part is hollow; the containment cavity of the body forms a first water inlet pipeline and a second water inlet pipeline, the first water inlet pipeline and the second water inlet pipeline are separated from each other, the second water inlet pipeline is in water communication with the spray hole;

a water outlet component, which is arranged at the open-ended of the containment cavity of the water outlet part, and the water outlet component is in water communication with the first water inlet pipeline;

a waterway switching device, which includes a water diversion valve core and a button, and the water diversion valve core includes a valve body, a valve shaft and a spring, the valve body is built into an inner cavity of the body, and its axial end opposite to the hand-held part is respectively provided with a first flow channel and a second flow channel, a third flow channel is provided at the other axial end of the hand-held part, the first flow channel is in communicates with the first water inlet pipeline, and the second flow channel is in communication with the second water inlet pipeline, the third flow channel is used to access the external water source flowing into the hand-held part, and the valve body is provided with a valve chamber, the valve chamber is respectively provided with a first water outlet and a second water outlet at the water inlet end corresponding to the first flow channel and the second flow channel, the valve chamber is provided with a third water outlet at the water outlet corresponding to the third flow channel, the spring and the valve shaft are sequentially arranged in the valve chamber from the inside to the outside, one end of the valve shaft is against the spring, and the other end is in interlocking contact with the button, and the valve shaft is provided with a water sealing member, the button is arranged on the outer wall of the body, and by pressing the button to overcome the elastic recovery force of the spring, the valve shaft is positioned in the valve chamber internal axial displacement, so that the water seal member on the valve shaft selectively blocks the waterway between the third water outlet and the first water outlet or the waterway between the third water outlet and the second water outlet realizes the water conduction of the first flow channel or the second flow channel;

a water stop device, which is arranged on the hand-held part and located on the water inlet channel flowing into the third flow channel, the water stop device includes a push rod, a water passing rod and a push button, the water passing rod is fixed in the inner cavity of the hand-held part, and one end is the water inlet end, which is used to connect with the external water source, and the other end is set with a water stop section, and a radial position of the water stop section is respectively provided with a first radial water outlet and a second radial water outlet, and the water passing rod is provided with a water baffle between the first radial water outlet and the second radial water outlet, the external water source flows in through the water inlet end of the water passing rod, and then passes through the first radial water outlet, the second radial water outlet and flows into the third flow channel; the push rod is axially penetrated, and it is movably sleeved outside the water stop section of the water passing rod; the push button is set on an outer wall of the hand-held part and the axial linkage with the push rod, by pushing the push button, the push rod is driven to generate axial displacement relative to the water passing rod, to realize the displacement or blockage of the inner wall of the push rod relative to the first radial water outlet, and realize the connection between the first radial water outlet and the third flow channel waterway conduction or blockage.

With the above-mentioned design, by adding the water stop device, and driven by the push button, the shower can be switched between the water stop state and the water flow state; at the same time, in the water flow state, by adding a water diversion valve driven by the button, the water flow selectively flows to the first flow channel and the second flow channel, and then sprays out through the water outlet component or the spray hole to realize different function for the shower.

Further, it also includes a fixed plate, which is fixed in the containment cavity of the water outlet part of the body, the first water inlet pipeline, the second water inlet pipeline and the spray hole are all provided on the inner end surface of the fixed plate, and the water passage hole is also provided in fixed plate, the water outlet part of the body is provided with a relif hole at a position relative to the spray hole; the second water inlet pipe includes a water inlet joint and a U-shaped water inlet chamber. One side of the U-shaped water inlet chamber is used for water communication with the water inlet joint, and the other side is used for water communication with the spray hole; the water inlet cavity is composed of a U-shaped water inlet tank and a water sealing cover. The first water inlet pipe, water inlet joint, U-shaped water inlet tank, spray hole and fixing plate are integrally injection molded, and the water sealing cover is fixed on top of the u-shaped water inlet tank by welding.

By integrally fixing the first water inlet pipe, the second water inlet pipe and the spray hole to the inner end surface of the fixed plate, the structural strength of the spray hole can be increased, and the assembly efficiency for shower can be improved.

BRIEF DESCRIPTION OF THE DRAWINGS

FIG. 7-1 is a longitudinal sectional view of the multifunctional shower of the present invention (the first flow channel is communication with waterway);

FIG. 7-2 is a longitudinal sectional view of the multifunctional shower of the present invention (the second flow channel is communication with waterway);

FIG. 8-1 is an enlarged view of part D-1 of FIG. 7-1;

FIG. 8-2 is an enlarged view of part D-2 in FIG. 7-2;

FIG. 9-1 is an enlarged view of part E-1 of FIG. 7-1;

FIG. 9-2 is an enlarged view of part E-2 in FIG. 7-2.

DETAILED DESCRIPTION OF THE EMBODIMENT(S) OF THE INVENTION

Technical solutions and advantageous effects of the present disclosure will be described in detail below with reference to the accompanying drawings.

Please refer to FIG. 2 to FIG. 6, the present invention discloses a multifunctional shower, including:

A body 1, it is the body of a hand-held shower, the body 1 includes a water outlet part 11 and a hand-held part 12 from top to bottom, and an end on the wall of the water outlet part 11 away from the hand-held part 12 is opened At least one relief hole 110

Figure 5:
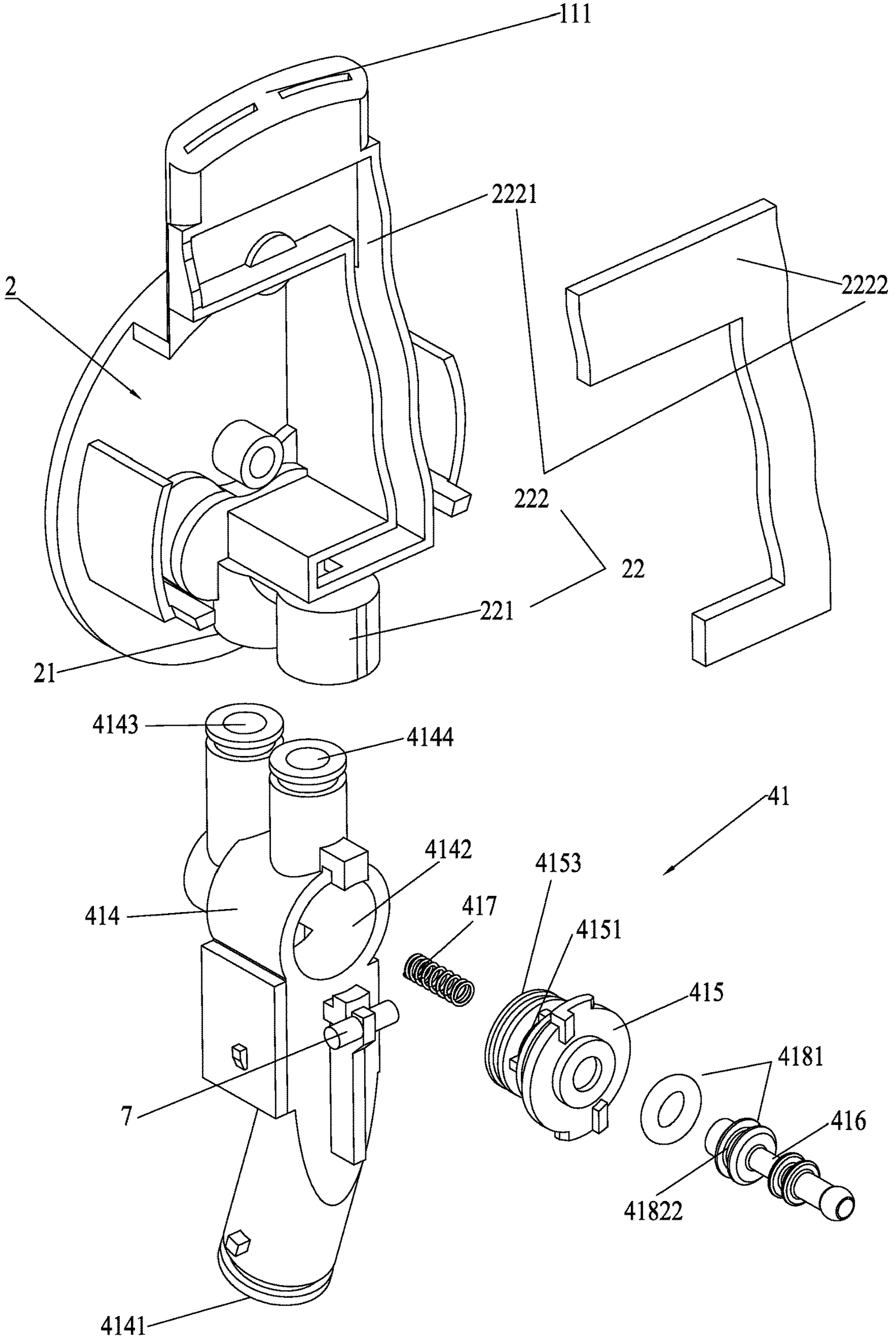
FIG. 5 is an enlarged view of part A of FIG. 4.

A fixed plate 2, the fixed plate 2 is non-rotatably arranged in the water outlet portion 11 of the body 1, generally the fixed plate 2 is fixed on the body 1 by ultrasonic welding, the inner end surface of the fixed plate 2 (water inlet end surface) are provided with the first water inlet pipeline 21, the second water inlet pipeline 22 and the spray hole 111 respectively, and a water passage hole 23 connected with the water outlet end of the first water inlet pipeline 21 is also provided on the fixed plate 2, so the water outlet end of the second water inlet pipeline 22 is in communication with the spray hole 111. More specifically, as shown in FIG. 5, the second water inlet pipeline 22 includes a water inlet joint 221 and a U-shaped water inlet chamber 222. One side of the water inlet chamber 222 is used to connect with the water inlet joint 221, and the other side is used to connect with the spray hole 111. The U-shaped water inlet chamber 222 is composed of a U-shaped water inlet tank 2221 and a water sealing cover 2222, preferably the first water inlet pipeline 21, water inlet joint 221, U-shaped water inlet tank 2221, spray hole 111 and fixed plate 2 are integrally injection molded, and the water sealing cover 2222 is fixed on the top of the water inlet tank 2221, so that the spray hole 111 can be stably fixed on the fixed plate 2, and the water outlet part 11 of body 1 is opposite to the relief hole 110, which is convenient for product assembly.

Figure 3:
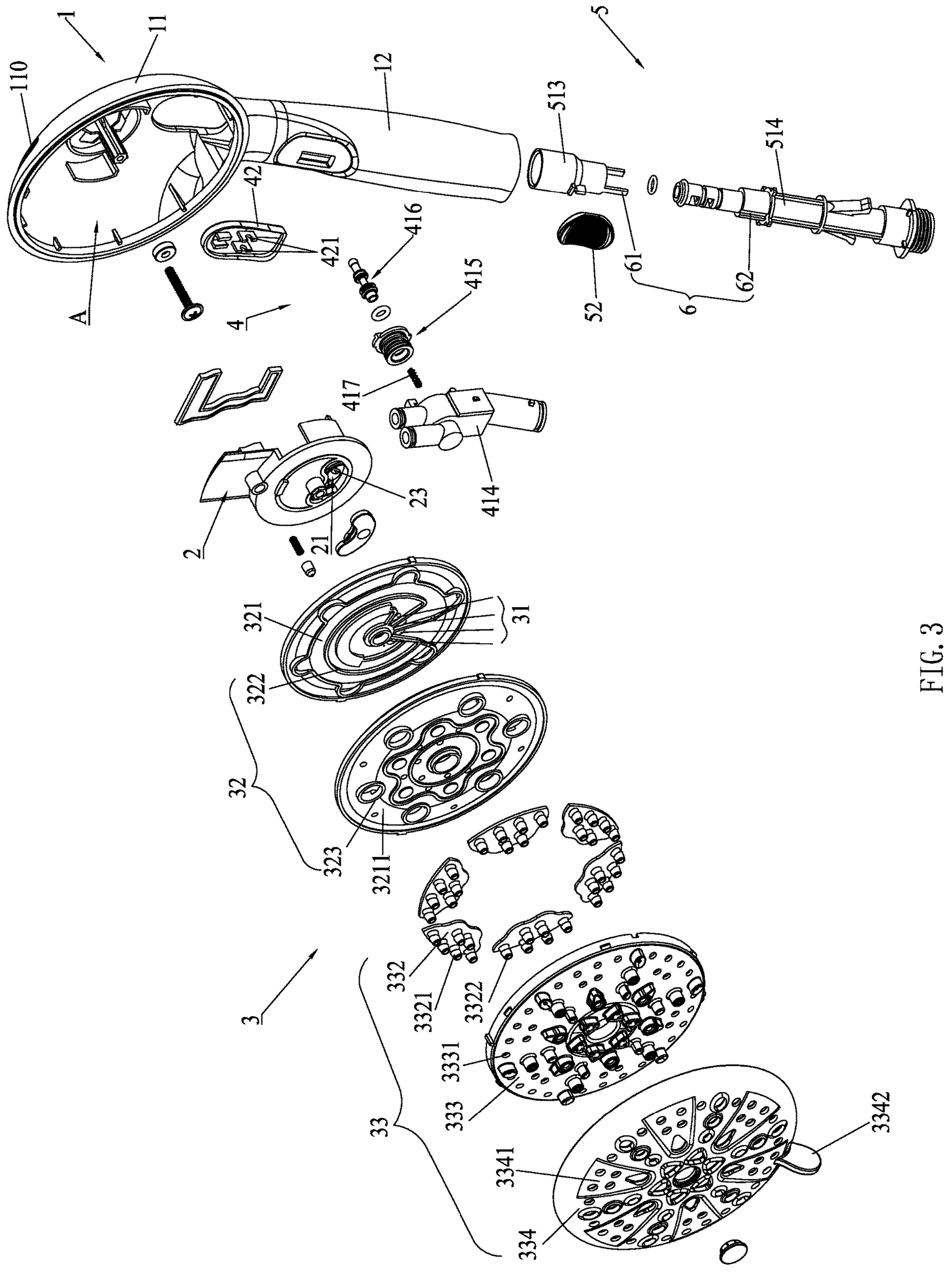
FIG. 3 is an exploded view of the multifunctional shower of the present invention.
Figure 4:
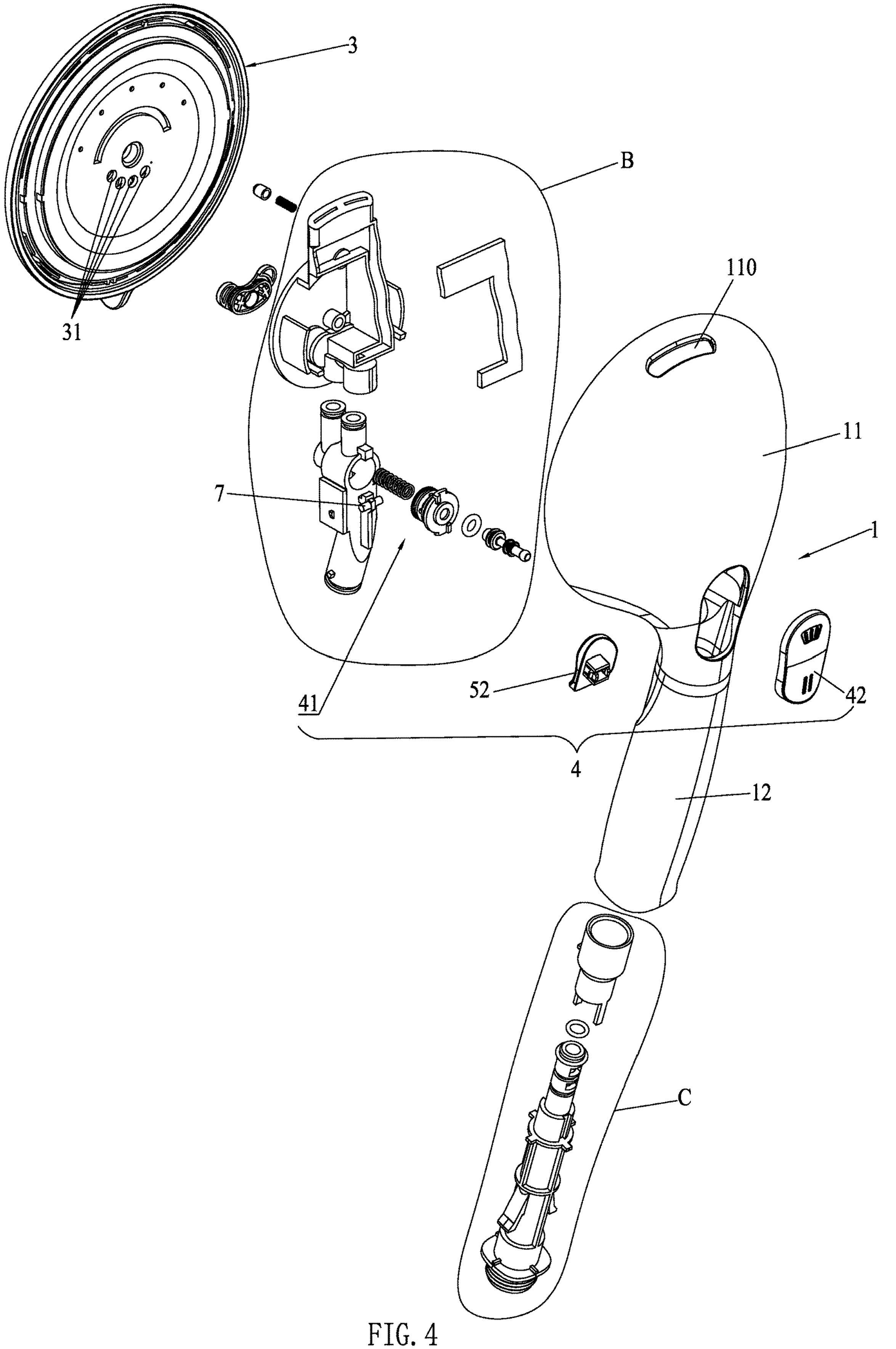
FIG. 4 is a partially exploded view of the multifunctional shower of the present invention.

A water outlet assembly 3, the water outlet assembly 3 is rotatably arranged on the fixed plate 2, please refer to FIG. 3, the water diversion assembly 32 includes a water diversion plate 322 and a water sealing sheet 323 from the inside to the outside in the axial direction, and the water diversion plate 322 and the water sealing sheet 323 are fastened and fixed to each other, in this embodiment, there are four water chambers 321 with water channels separated from each other, the end face of the water sealing sheet 323 opposite to the water diversion tray 322 is the water outlet end face, and each water chamber 321 is provided with a water inlet hole 31 on the water inlet end face at the corresponding position, and at the same time, a water inlet hole 31 is opened on the water outlet end face at the corresponding position. At least one water outlet 3211 connected with the waterway is provided. The water outlet panel assembly 33 includes a number of mutually independent water outlet rubber pads 332, water outlet surface covers 333 and decorative surface covers 334 from inside to outside in the axial direction. A water passage hole 3322 is formed on the boss 3321, and the outer circumference of the inner end surface of the water outlet cover 333 is provided with several water chambers 321, and the water outlet cover 333 forms a plurality of first through holes 3331 at positions corresponding to the water outlet boss 3321, each water outlet rubber pad 332 is embedded in the corresponding water collection chamber, and at the same time, each water outlet protrusion 3321 of the water outlet rubber pad 332 protrudes from the first through hole 3331 at the corresponding position of the water outlet cover 333 and the water outlet protrusion 3321, the first water outlet terminal group is formed. In this embodiment, the water outlet surface cover 333 also adds a number of second water outlet terminal groups, third water outlet terminal groups, and fourth water outlet terminal groups that can produce different functional splashes. and the above-mentioned different functional water splashes is a conventional technical means and will not be described in detail here. The decorative surface cover 334 is fixed on the outer end surface of the water outlet surface cover 333. The decorative surface cover 334 is provided with a second through hole 3341 at a position opposite to the first through hole 3331, and at a position opposite to each water outlet terminal. The position of the group corresponds to opening a number of matching third through holes 3343, and a switch handle 3342 is fixed on the outer end surface of the decorative surface cover 334. By driving the switch handle 3342, the water passage hole 23 of the fixed plate 2 is selectively the ground is connected to the water inlet hole 31 of the water diversion assembly 32, so as to realize the water channel switching of different functional sprays of the shower.

Figure 1:
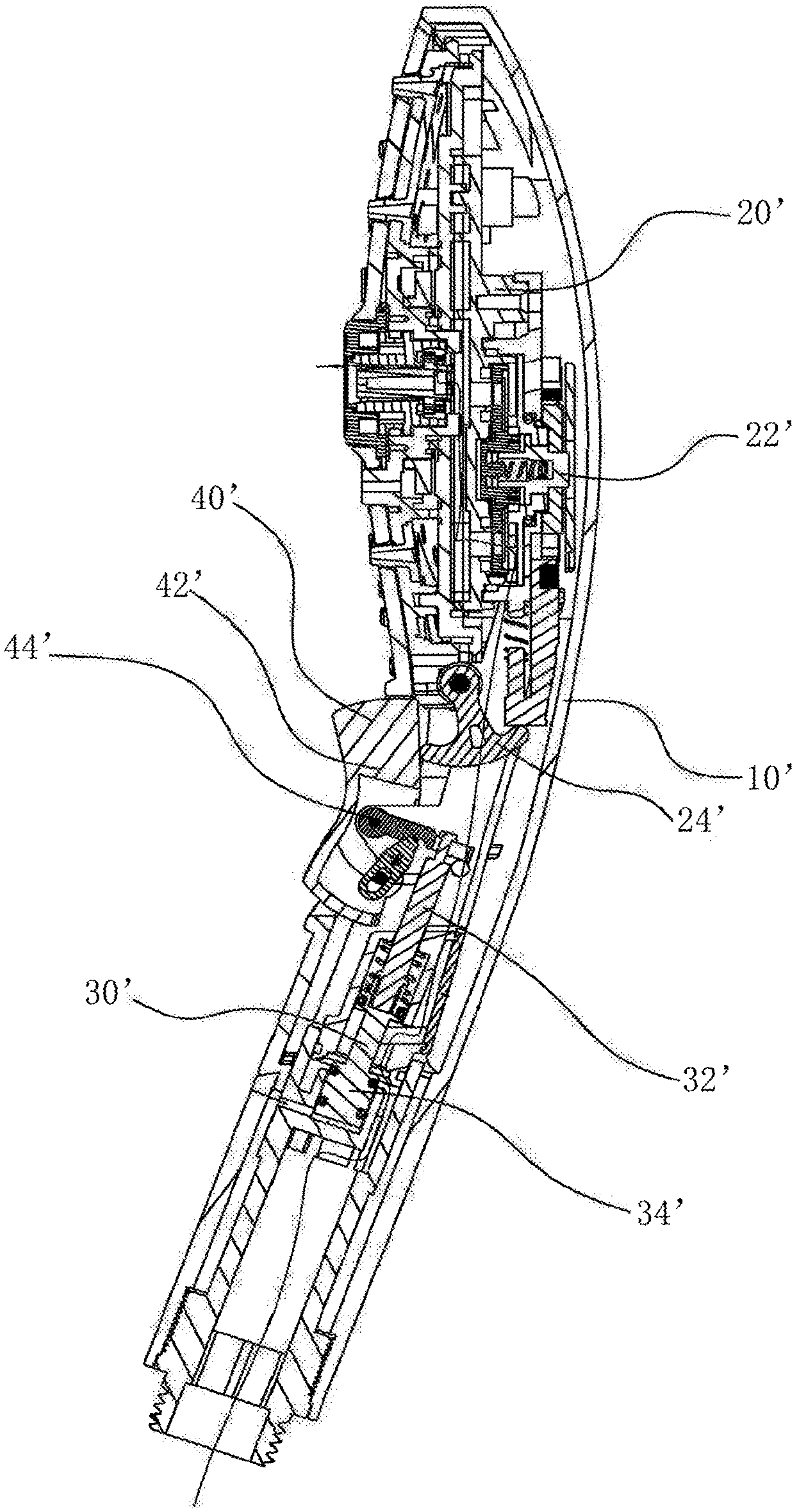
Prior Art FIG. 1
FIG. 1 is a conventional structural representation.
Figure 2:
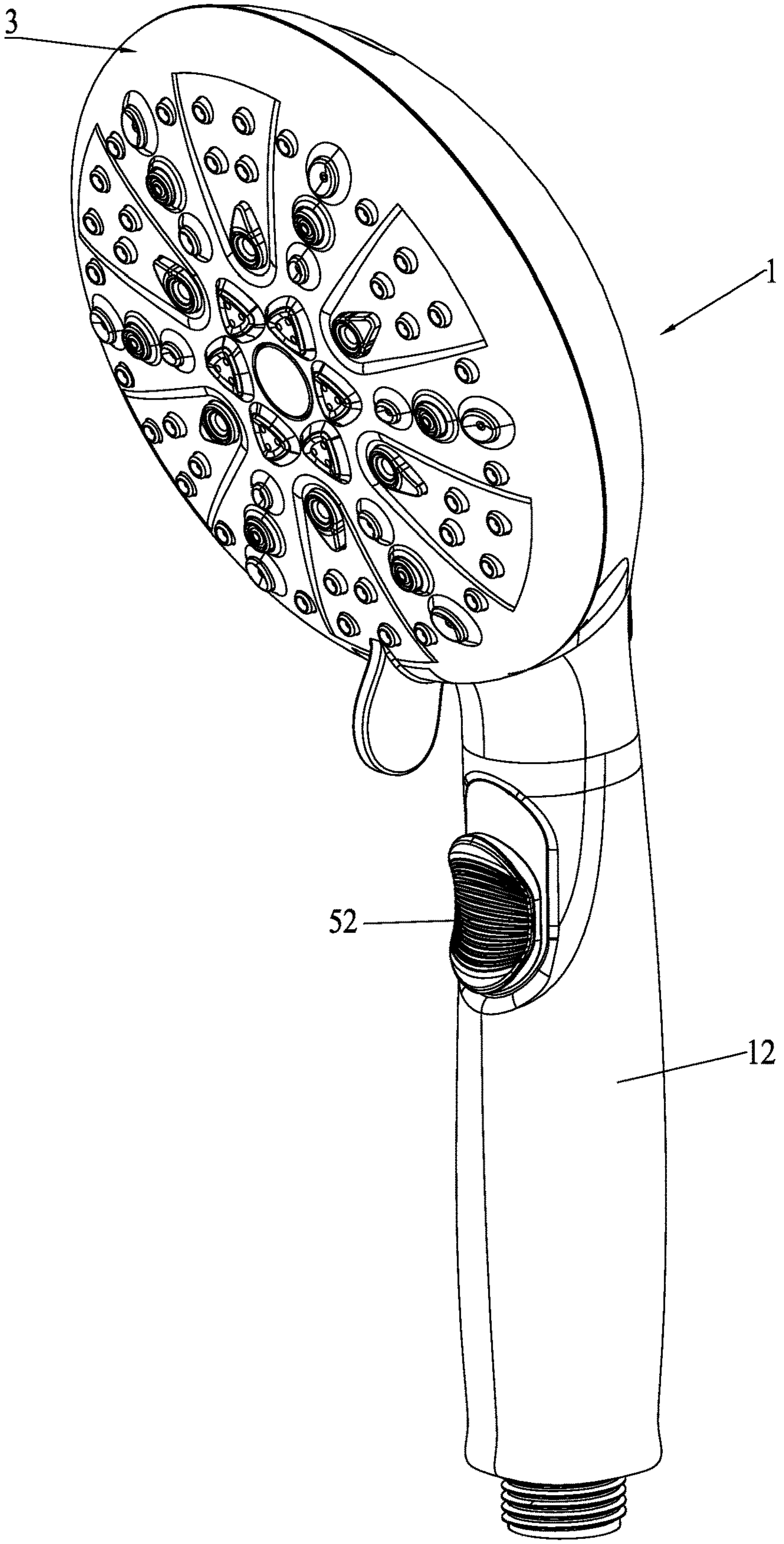
FIG. 2 is a three-dimensional combined structure diagram of the multifunctional shower of the present invention.
Figures 1, 7:
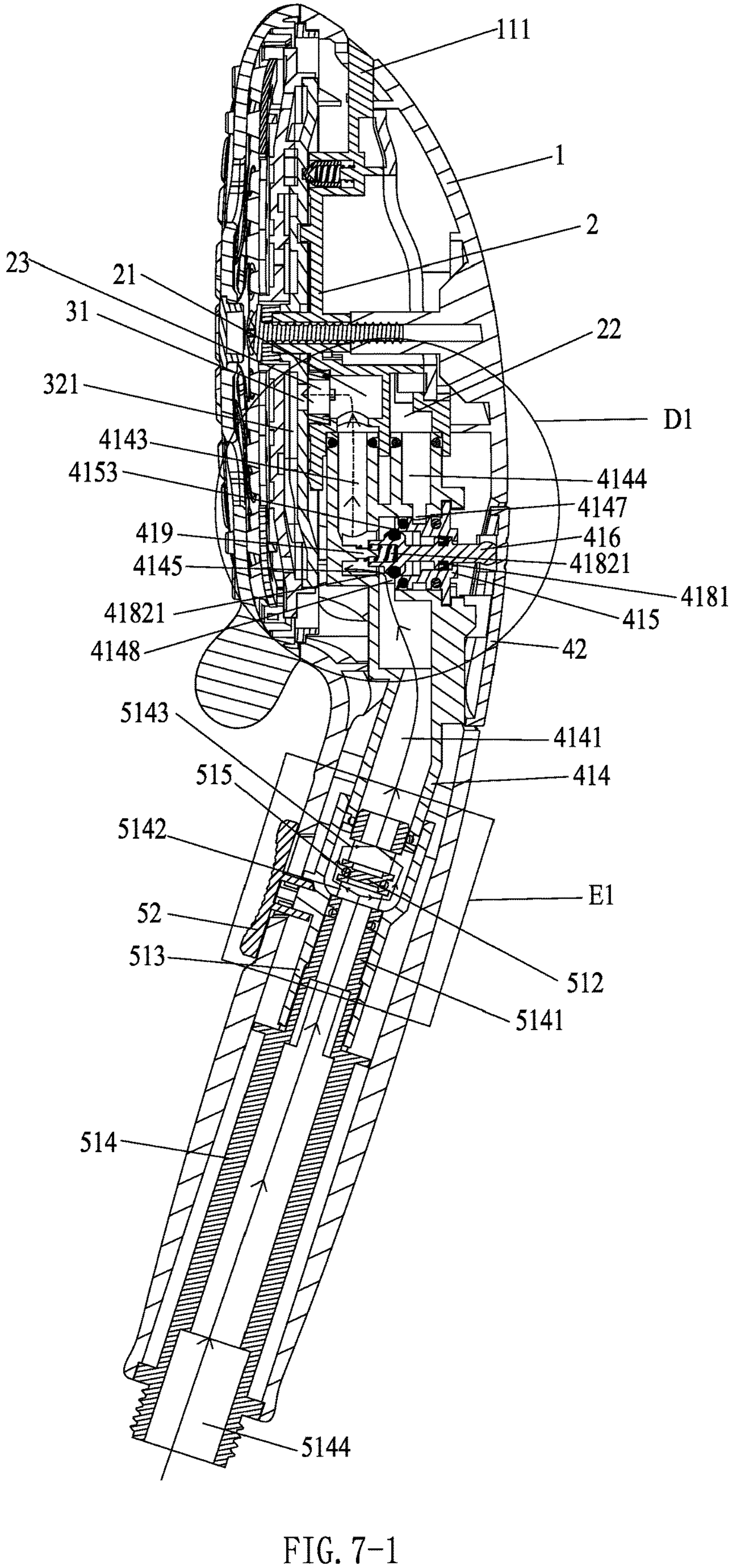
Figures 2, 7:
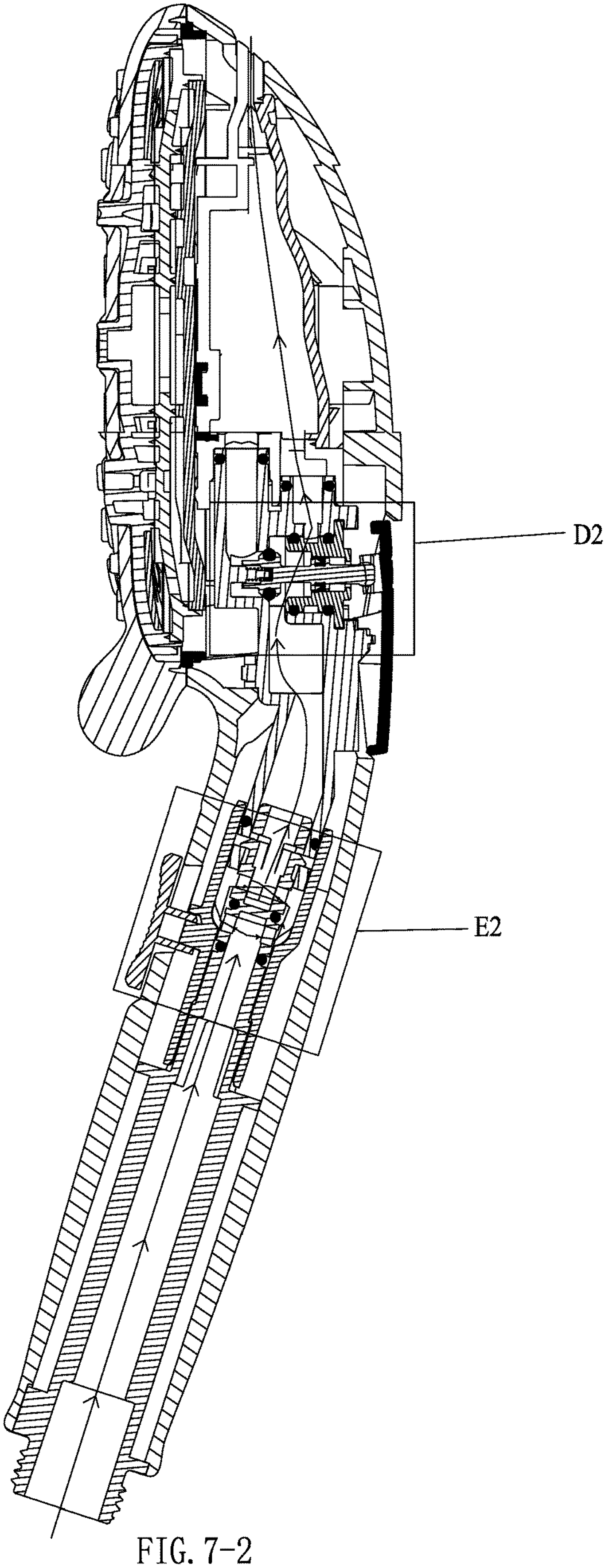
Figures 1, 8:
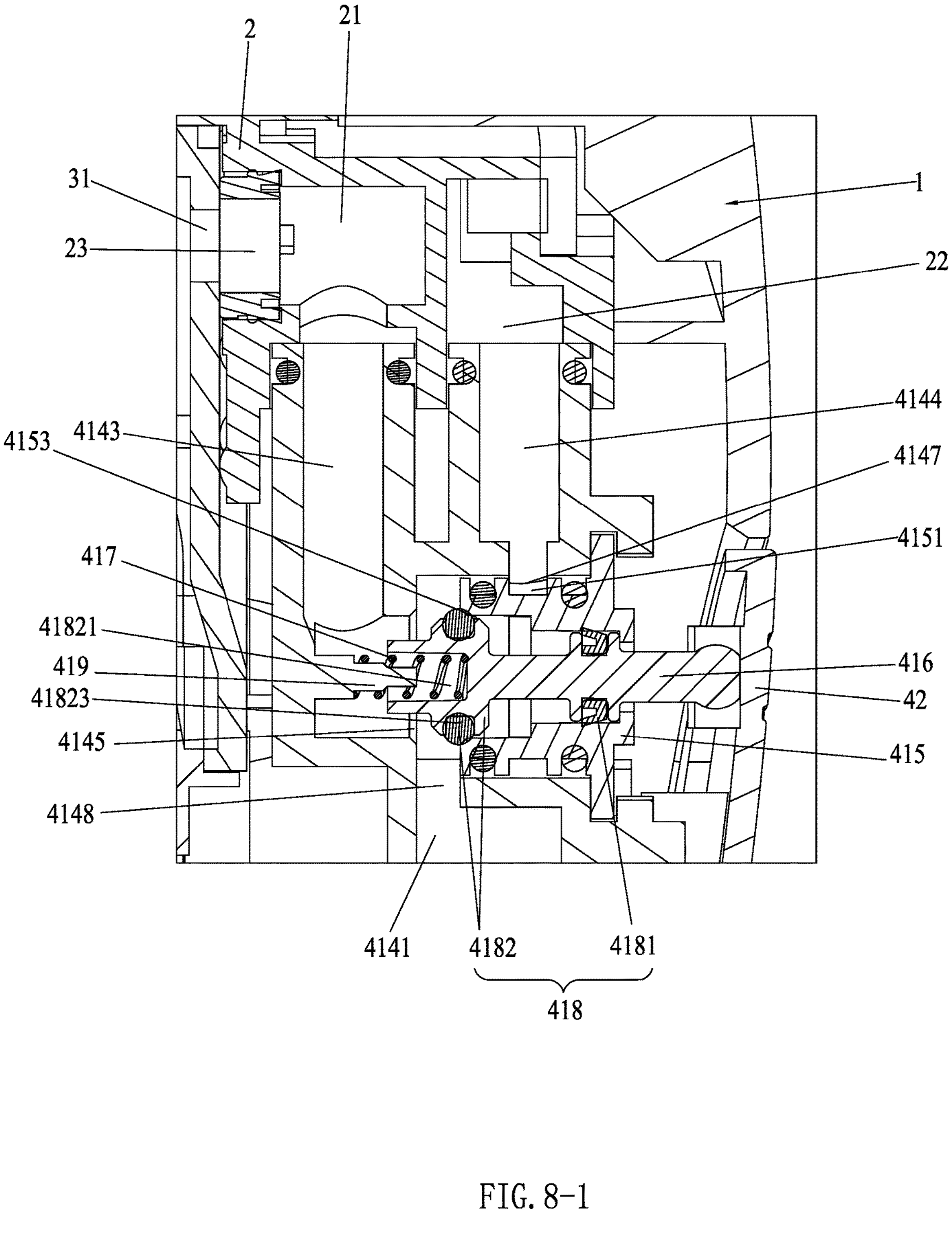
Figures 2, 8:
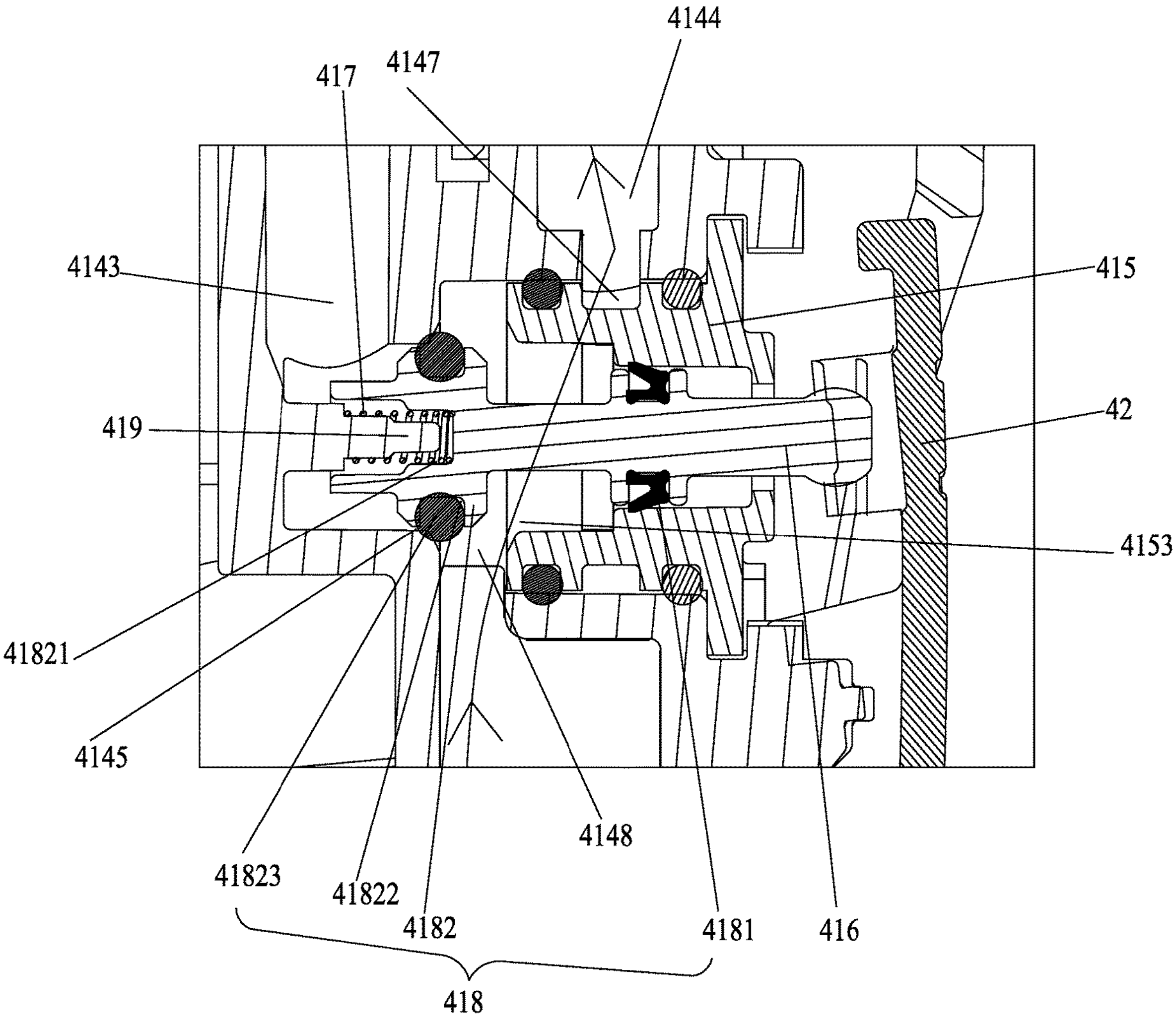

Please refer to FIG. 3 and FIG. 5, it includes a water diversion valve core 41 and a button 42, the water diversion valve core 41 includes a valve body 414, a valve sleeve 415, a valve shaft 416 and a spring 417, and the valve body 414 is built into the body 1, a first flow channel 4143 and a second flow channel 4144 are respectively provided at one axial end of the hand-held part 12, and a third flow channel 4141 is provided at the other axial end of the hand-held part 12. The first flow channel 4143 is in water communication with the first water inlet pipeline 21, the second flow channel 4144 is in water communication with the second water inlet pipeline 22, and the third flow channel 4141 is used to access the external water source flowing into the hand-held part 12, the valve body 414 is provided with a valve chamber 4142 in the radial direction relative to the hand-held part 12 and at a position of the confluence area of the first flow channel 4143, the second flow channel 4144 and the third flow channel 4141. The water inlet ends of the first flow channel 4143 and the second flow channel 4144 are respectively provided with a first water outlet 4145 and a second water outlet 4147, and the valve chamber 4142 is provided with a third water outlet 4148 at the water outlet corresponding to the third flow channel 4141, the valve sleeve 415 penetrates axially, and a fourth water outlet 4151 is provided at its radial end, the valve sleeve 415 is coaxially fixed in the valve chamber 4142. The second water outlet 4147 is only water communication with the fourth water outlet 4151, the axial opening end of the valve sleeve 415 and the position relative to the first water outlet 4145 are defined as the fifth water outlet 4153, and the valve shaft 416 is axially displaced and sleeved in the valve sleeve 415, The water sealing member 418 of the valve shaft 416 includes a radial seal 4181 and a plug 4182, the radial seal 4181 is used to prevent water from overflowing from the fitting gap between the valve shaft 416 and the valve sleeve 415, the plug 4182 is set at the end of the valve shaft 416 away from the button 42, the plug 4182 of the valve shaft 416 is a large diameter end, and the maximum diameter of the plug 4182 is respectively larger than the first water outlet 4145 and the fifth water outlet 4153, and the radial end of the plug 4182 forms an annular groove 4182, and the annular groove 41822 is sleeved with a first sealing ring 41823; the axial position of the plug 4182 of the valve shaft 416 is provided with a counterbore 41821, the inner wall of the first flow channel 4143 is provided with a positioning column 419 at a position relative to the counterbore 41821, one end of the spring 417 is sleeved on the positioning column 419, and the other set is built in the counterbore 41821; As shown in FIG. 5, the button 42 is set on the side of the body 1 opposite to the water outlet assembly 3, and is located at the adjacent position between the hand-held part 12 and the water outlet part 11, and the valve body 414 is provided with a pivot 7 on the side facing the button 42, the middle part of the button 42 is provided with a pivot hole 421, and the button 42 is pivotally arranged on the valve body 414. By pressing the button 42 to overcome the elastic restoring force of the spring, the valve shaft 416 is positioned on the shaft of the valve sleeve 415. More specifically: as shown in FIG. 7-1 and FIG. 8-1, when the button 42 is not pressed, the plug 4182 of the valve shaft 416 blocks the fifth water outlet 4153, and the third flow channel 4141 and the first flow channel 4143 is water communication with each other; as shown in FIG. 7-2 and FIG. 8-2, when the button 42 is pressed, the plug 4182 of the valve shaft 416 blocks the first water outlet 4145, and the third flow channel 4141 and the second flow channel 4144 is is water communication with each other.

Figure 6:
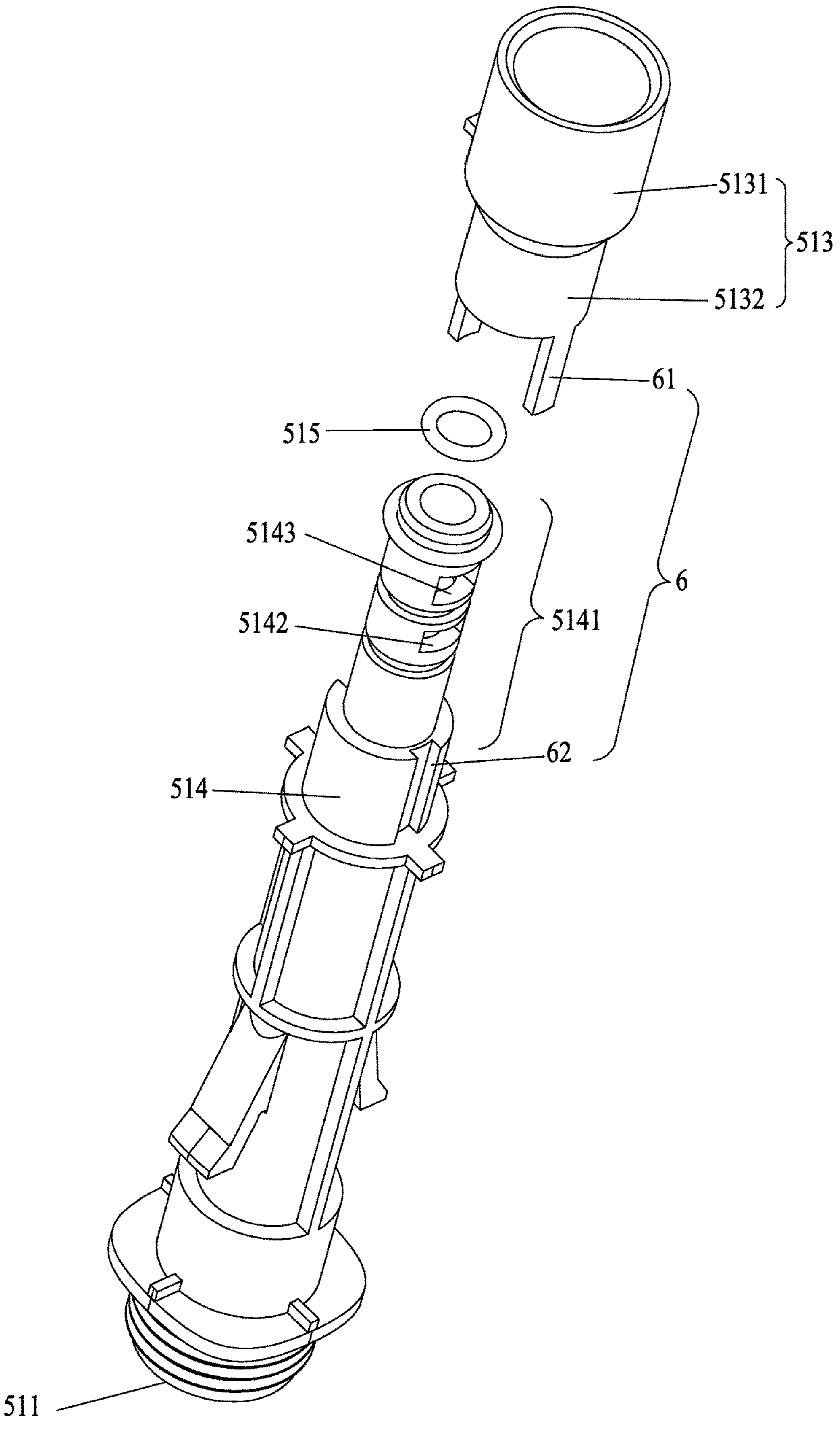
FIG. 6 is an enlarged view of part B of FIG. 4.
Figures 1, 9:
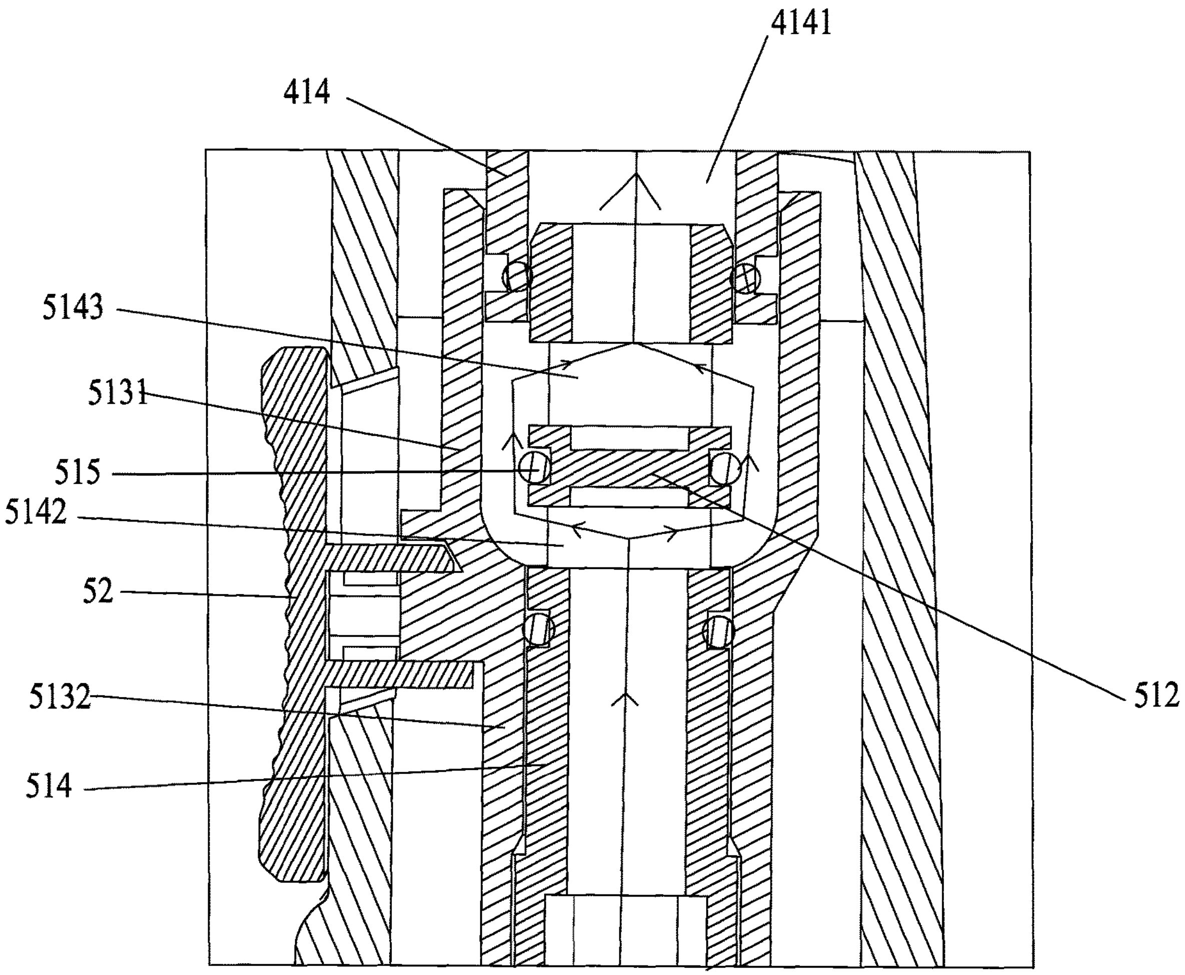
Figures 2, 9:
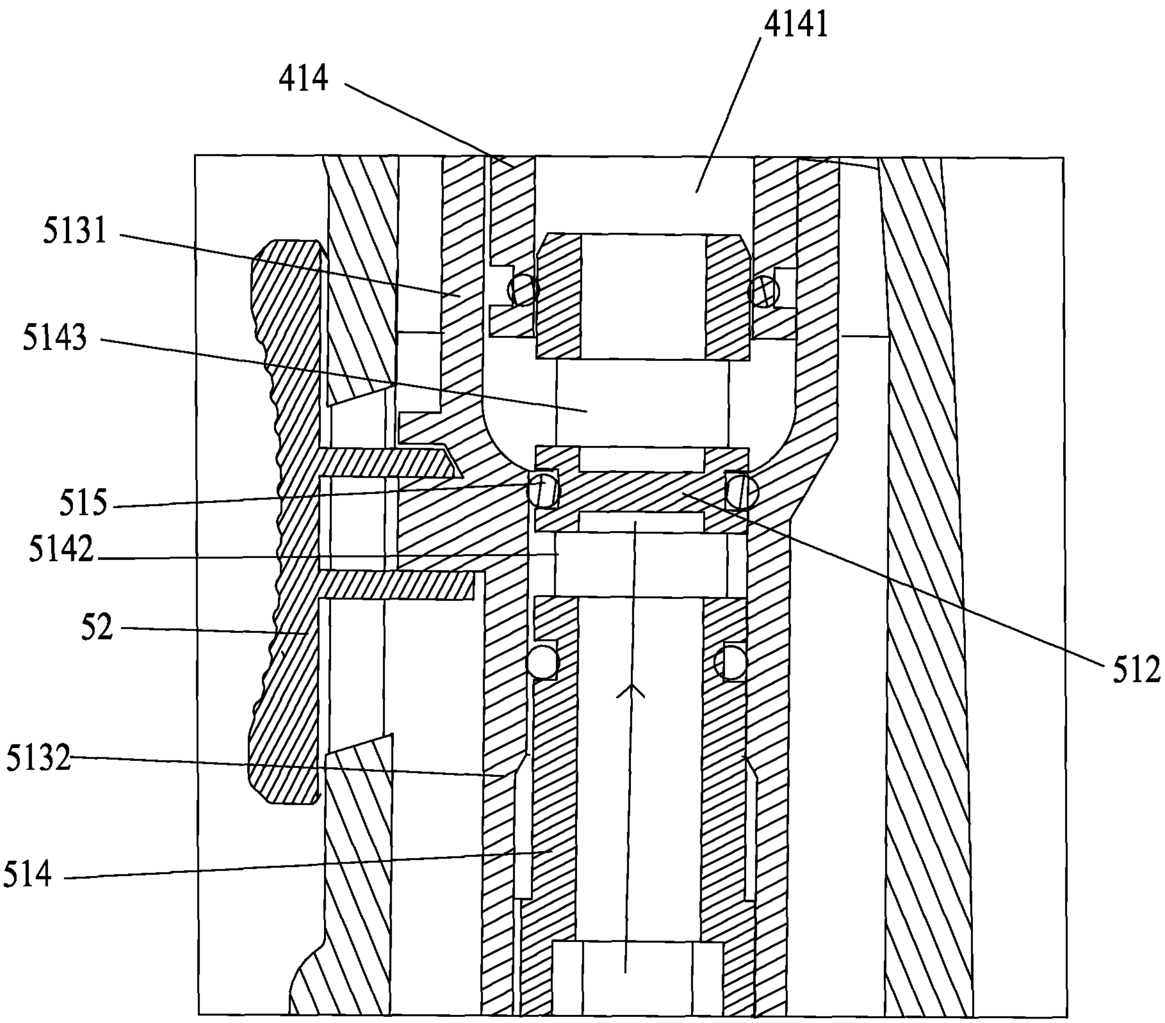

Please refer to FIG. 6, a water stop device 5, which is arranged on the hand-held part 12 and is located on the water inlet channel flowing into the third flow channel 4141, the water stop device 5 includes a push rod 513, a water passing rod 514 and a push button 52, the water passing rod 514 is fixed in the inner cavity of the hand-held part 12, one end of which is a water inlet end 511, which is used to communicate with the external water source of the hand-held part 12, and the other end is provided with a water stop section 5141, The radial positions of the water stop section 5141 are respectively provided with a first radial water outlet 5142 and a second radial water outlet 5143, and the water passing rod 514 is located between the first radial water outlet 5142 and the second radial outlet. A partition 512 is set between the water outlets 5143, and the external water source flows in through the water inlet 511 of the water passing rod 514, and then passes through the first radial water outlet 5142, the second radial water outlet 5143 and flows into the third flow channel 4141; The push rod 513 penetrates axially, and is movably sleeved outside the water-stop section 5141 of the water-passing rod 514. With a more optimized design, the push rod 513 has a large-diameter section 5131 and a small-diameter section along the axial direction. Section 5132, the large-diameter section 5131 is used to nest the third flow channel 4141, the water-stop section 5141 of the water passing rod 514 is partially inserted into the third flow channel 4141, and partially inserted into the pushing In the small-diameter section 5132 of the rod 513, and the water passing rod member 514 is provided with at least one second sealing ring 515 between the first radial water passing port 5142 and the second radial water passing port 5143, when the push rod 513 The inner wall of the small-diameter section 5132 blocks the first radial water outlet 5142, and the second sealing ring 515 is used to prevent water from leaking outward from the gap between the small-diameter section 5132 of the push rod 513 and the water-passing rod 514; A guide mechanism 6 is arranged between the push rod 513 and the water passing rod 514, and the guide mechanism 6 includes a plurality of guide posts 61 and chute 62, and the guide posts 61 extend outward from the axial end of the push rod 513. The chute 62 is arranged on the outer wall of the water passing rod 514 and relative to the position of the guide post 61. Through the guiding fit between the guide post 61 and the chute 62, the push rod 513 can move along its axis relative to the water-passing rod 514. Slide in a straight line; the push button 52 is set on the side of the hand-held part 12 located in the same direction as the water outlet assembly 3 and is axially linked with the push rod 513. By pushing the push button 52, the push rod 513 is driven relative to the water passing rod The member 514 produces an axial displacement, as shown in FIG. 9-1, the push button 52 is located at the bottom end, the first radial water outlet 5142 is located at the large diameter section 5131 of the push rod 513, and the water flowing into the water passing rodbody 514 passes through the first A radial water outlet 5142 flows into the second radial water outlet 5143 and finally flows into the third flow channel 4141 to realize the conduction of the external waterway; as shown in FIG. 9-2, the push button 52 is displaced upward to drive the push rod 513 relative The water passing rod 514 moves upward, and the inner wall of the small-diameter section 5132 of the push rod 513 and the second sealing ring 515 jointly block the first radial water outlet 5142, so that the water channel flowing into the water passing rod 514 is blocked in the partition 512, Realize the blockage of the external waterway.

Concrete Working Principle of the Present Invention:

Please refer to FIG. 7-1 to FIG. 9-2, by pushing the push button 52, the push rod 513 is driven to move the switch waterway in the open position and the closed position in the axial direction; when the waterway is in the open state and the button 42 is pressed inward, the synchronization Drive the valve shaft 416 to move inward along its axial direction. At this time, the external water source flows in through the water inlet end 511 of the water passing rod 514, the first radial water outlet 5142, the second radial water outlet 5143, the third flow channel 4141, the third water outlet 4148, the fifth water outlet 4153, the fourth water outlet 4151, the second water outlet 4147, and then flow into the second flow channel 4144 in sequence, and finally flow into the second water inlet pipe 22 and outward from the spray hole 111; when the external force of the button 42 is released, the spring 418 applies the elastic restoring force to the valve shaft 416, driving the valve shaft 416 to move outward along its axial direction, and the water flowing into the third flow channel 4141 passes through the third water outlet 4148 in sequence, the first water outlet 4145, flows into the first flow channel 4143, and finally flows into the first water inlet pipeline 21 to realize the waterway conduction of the water outlet assembly 3; when the push button 52 is in the closed position, the water paths between the first radial water outlet 5142 and the second radial water outlets 5143 are separated from each other, so that the water flow cannot flow into the third flow channel 4141 of the water diversion valve core 41, thereby realizing the function of water stop.

The focus of the present invention is: by adding the water stop device 5, and driven by the push button 52, the shower can be switched between the water stop state and the water flow state; the water diversion valve core 41 driven by the button 42, makes the water flow selectively flow to the first flow channel 21 or the second flow channel 22, and then spray out through the water outlet assembly 3 or the spray hole 111; when the water flows to the first flow channel 21 (shower water inlet), by rotating the water outlet assembly 3, the water flow is selectively connected to the water inlet hole 31 of the water outlet assembly 3 through the water passage hole 23 of the fixed plate 2, thereby realizing the water channel switching of different functions. Compared with the traditional shower, the present invention has the functions of water stop, spray gun and multi-functional spray, which satisfies the user's shower needs to a great extent and improves the shower experience. Both the second water inlet pipeline 22 and the spray hole 111 are arranged on the fixed plate 2, which greatly increases the assembly efficiency of the product.

The above description merely relates to embodiments of the present disclosure, and is not intended to limit the design of the present disclosure. Any equivalent changes made according to key points of the design of the present disclosure will fall within the scope of protection of the present disclosure.

What is claimed is:

1. A multifunctional shower, comprising:

a body, which is composed of a water outlet part and a hand-held part, the water outlet part is provided with an open-ended containment cavity, and at least one spray hole is provided at an end away from the hand-held part, an inner cavity of the hand-held part is hollow; the containment cavity of the body forms a first water inlet pipeline and a second water inlet pipeline, the first water inlet pipeline and the second water inlet pipeline are separated from each other, the second water inlet pipeline is in water communication with the spray hole;

a water outlet component, which is arranged at the open-ended of the containment cavity of the water outlet part, and the water outlet component is in water communication with the first water inlet pipeline;

a waterway switching device, which includes a water diversion valve core and a button, and the water diversion valve core includes a valve body, a valve shaft and a spring, the valve body is built into an inner cavity of the body, and its axial end opposite to the hand-held part is respectively provided with a first flow channel and a second flow channel, a third flow channel is provided at the other axial end of the hand-held part, the first flow channel is in communication with the first water inlet pipeline, and the second flow channel is in communication with the second water inlet pipeline, the third flow channel is used to access the external water source flowing into the hand-held part, and the valve body is provided with a valve chamber, the valve chamber is respectively provided with a first water outlet and a second water outlet at the water inlet end corresponding to the first flow channel and the second flow channel, the valve chamber is provided with a third water outlet at the water outlet corresponding to the third flow channel, the spring and the valve shaft are sequentially arranged in the valve chamber from the inside to the outside, one end of the valve shaft is against the spring, and the other end is in interlocking contact with the button, and the valve shaft is provided with a water sealing member, the button is arranged on the outer wall of the body, and by pressing the button to overcome the elastic recovery force of the spring, the valve shaft is positioned in the valve chamber internal axial displacement, so that the water seal member on the valve shaft selectively blocks the waterway between the third water outlet and the first water outlet or the waterway between the third water outlet and the second water outlet realizes the water conduction of the firstflow channel or the second flow channel;

a water stop device, which is arranged on the hand-held part and located on the water inlet channel flowing into the third flow channel, the water stop device includes a push rod, a water passing rod and a push button, the water passing rod is fixed in the inner cavity of the hand-held part, and one end is the water inlet end, which is used to connect with the external water source, and the other end is set with a water stop section, and a radial position of the water stop section is respectively provided with a first radial water outlet and a second radial water outlet, and the water passing rod is provided with a water baffle between the first radial water outlet and the second radial water outlet, the external water source flows in through the water inlet end of the water passing rod, and then passes through the first radial water outlet, the second radial water outlet and flows into the third flow channel; the push rod is axially penetrated, and it is movably sleeved outside the water stop section of the water passing rod; the push button is set on an outer wall of the hand-held part and the axial linkage with the push rod, by pushing the push button, the push rod is driven to generate axial displacement relative to the water passing rod, to realize the displacement or blockage of the inner wall of the push rod relative to the first radial water outlet, and realize the connection between the first radial water outlet and the third flow channel waterway conduction or blockage.

2. The multifunctional shower according to claim 1, wherein the first flow channel is set at the end away from the button, and the first water outlet is opened at the first flow channel relative to the axial position of the valve shaft; it also includes a valve sleeve, the valve sleeve is axially penetrated, and a fourth water outlet is provided at its radial end, the valve sleeve is coaxially fixed in the valve chamber, and the second water outlet is only in communication with the fourth water outlet, the position of the axial opening end of the valve sleeve relative to the first water outlet is defined as the fifth water outlet, and the valve shaft can be axially Set in the valve sleeve with displacement, the water seal of the valve shaft includes a radial seal and a plug, the radial seal is used to prevent water from overflowing from the fit gap between the valve shaft and the valve sleeve, and the plug is set the end of the valve shaft away from the button, when the button is not pressed, the plug of the valve shaft blocks the fifth water outlet, and the third flow channel is in water communication with the first flow channel, and when the button is pressed, the plug of the valve shaft blocks the first water outlet, the third flow channel is in water communication with the second flow channel.

3. The multifunctional shower according to claim 2, wherein a counterbore is provided at an axial position of the plug of the valve shaft, and the first flow channel is provided with a positioning column at a position relative to the counterbore, one end of the spring is sleeved on the positioning column, and the other set is built into the counterbore.

4. The multifunctional shower according to claim 2, wherein the plug of the valve shaft is a large diameter end, and the maximum diameter of the plug is respectively larger than the hole diameters of the first water outlet and the fifth water outlet, and the radial end of the plug forms an annular groove, and the annular groove is sleeved with a first sealing ring.

5. The multifunctional shower according to claim 1, wherein the button is set on the side of the body opposite to the water outlet assembly, and is located between the hand-held part and Adjacent to the water outlet part.

6. The multifunctional shower according to claim 5, wherein the valve body is provided with a pivot on the side facing the button, and the middle part of the button are provided with pivot holes, and the button is pivotally arranged on the valve body.

7. The multifunctional shower according to claim 1, wherein a guide mechanism is set between the push rod and the water passing rod, and the guide mechanism includes several guide posts and chutes, the guide posts extends outward from the axial end of the push rod, and the chutes are arranged on the water passing rod and relative to the position of the guide posts, through the guiding fit between the guide posts and the chutes, the push rod can be moved along the axial direction respect to the water passing rod.

8. The multifunctional shower according to claim 1, wherein the push rod has a large diameter section and a small diameter section along the axial direction, and the large diameter section is used to nest the third flow channel in it, and the water stop section of the water passing rod is partially inserted in the third flow channel, and partially inserted in the small diameter section of the push rod, and the water passing rod is provided with at least one second sealing ring between the first radial water passage and the second radial water passage, when the inner wall of the small-diameter section of the push rod blocks the first radial water passage, the second sealing ring is used to prevent water from flowing the gap between the small diameter section of the push rod and the water passing rod leaks outward.

9. The multifunctional shower according to claim 8, wherein that the push button is set on the side where the hand-held part is located in the same direction as the water outlet assembly.

10. The multifunctional shower according to claim 1, wherein it also includes a fixed plate, which is fixed in the containment cavity of the water outlet part of the body, so that the first water inlet pipeline, the second water inlet pipeline and the spray hole are all provided with the inner end surface of the fixed plate, and the fixed plate is also provided with a water passage hole, realize the waterway conduction between the first water inlet pipeline and the water outlet assembly through the water passage hole, and the water outlet part of the body is provided with a relif hole at a position relative to the spray hole.

11. The multifunctional shower according to claim 10, wherein, the second water inlet pipeline includes a water inlet joint and a U-shaped water inlet chamber, and the U-shaped water inlet chamber one side is used to communicate with the water inlet joint, and the other side is used to communicate with the spray hole.

12. The multifunctional shower according to claim 11, wherein the u-shaped water inlet cavity is composed of a u-shaped water inlet tank and a water sealing cover, the first water inlet pipeline, water inlet joint, U-shaped water inlet tank, spray hole and fixed plate are integrally injection molded, and the water sealing cover plate is fixed on the top of the u-shaped water inlet tank by welding.

13. The multifunctional shower according to claim 10, wherein, the water outlet assembly is rotatably arranged at the opening end of the containment cavity of the body, and it has the ability to spray outwards at least two different types of water splashes, each type of water splash is provided with an independent water-holding chamber in the water outlet assembly, and each of the water-holding chambers faces the fixed plate correspondingly opens a water inlet hole, by rotating the water outlet assembly, the water passage hole of the fixed plate is selectively connected with the water inlet hole of the water outlet assembly, so as to realize the switching of different types of water splashes.

* * * * *